US000001512H

United States Statutory Invention Registration [19]

[11] Reg. Number: H1512

Cowan et al.

[45] Published: Jan. 2, 1996

[54] VISCOUS COUPLING PLATE HARDENING AND FLATTENING METHOD

[75] Inventors: Thomas W. Cowan, Liverpool; Sankar K. Mohan; Carl F. Stephens, both of Syracuse, all of N.Y.

[73] Assignee: New Venture Gear, Inc., Troy, Mich.

[21] Appl. No.: 203,016

[22] Filed: Feb. 28, 1994

[51] Int. Cl.[6] ..... C23C 8/30

[52] U.S. Cl. ..... 148/219; 148/645

[58] Field of Search ..... 148/219, 645

[56] References Cited

U.S. PATENT DOCUMENTS

| | | | |
|---|---|---|---|
| 1,535,191 | 4/1925 | Wemp | 148/604 |
| 2,814,580 | 11/1957 | Hoover | 148/320 |
| 3,510,367 | 5/1970 | Berger | 148/631 |
| 3,806,379 | 4/1974 | Darr, Sr. | 148/604 |
| 4,210,843 | 7/1980 | Avadani | 29/25.18 |
| 4,496,401 | 1/1985 | Dawes et al. | 148/318 |
| 4,713,122 | 12/1987 | Dawes et al. | 148/232 |
| 4,793,871 | 12/1988 | Dawes et al. | 148/218 |

OTHER PUBLICATIONS

New Venture Gear Process Standard No. 632 Rev. A, Dec. 5, 1991 2 pages.

Metals Handbook, "Nitriding", 1948 Edition, The American Society for Metals, 1948, pp. 697–702.

*Primary Examiner*—Donald P. Walsh
*Assistant Examiner*—Anthony R. Chi

[57] ABSTRACT

A method of hardening and flattening a viscous coupling plate generally combining a heat treatment process followed by roller leveling is disclosed. The heat treatment process produces an epsilon iron nitride surface layer of the desired hardness on the plate. Subsequent to the heat treatment, the plates are passed through a series of leveling rolls to produce a sufficiently flat plate. The flat rolling process can incorporate a single pass or multiple passes through the leveling rolls. The method of the present invention eliminates any distortion in the plates and brings them within any required flatness specifications, as well as producing viscous coupling plates that exhibit improved resistance to permanent deformation under operating conditions.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VISCOUS COUPLING PLATE HARDENING AND FLATTENING METHOD

BACKGROUND AND SUMMARY OF THE INVENTION

1. Field of the Invention

The present invention relates generally to the plates employed in a viscous coupling apparatus of the type used in motor vehicles and, more particularly, to a method for manufacturing a viscous coupling plate exhibiting improved wear resistance and improved resistance to permanent deformation under operating conditions.

2. Discussion

Viscous couplings are used in various applications within the drivetrain of a motor vehicle. In general, viscous couplings include a rotatable input member and a rotatable output member, both members being rotatable about a common axis. Typically, the output member is a hub and the input member is a housing that creates a hermetically sealed chamber around the hub. Contained within the chamber are two sets of viscous coupling plates that are interleaved with one another. The first set of plates, the inner viscous coupling plates, are splined to the hub and rotatable with the hub. Similarly, a second set of plates, the outer viscous coupling plates, are splined to the housing and rotatable with the housing. Filling the remaining space within the chamber is a high viscosity fluid, such as silicone oil, and a small amount of a gas or air.

In operation, a slight difference in the rotational speed between the input and output members of the viscous coupling (i.e. slip) is permitted due to the relatively low viscous shear rate within the fluid. However, as the speed differential between the input and output members increases, the viscous shear rate of the fluid also increases. As this occurs, the fluid works to transmit torque from the input member to the output member. Eventually, a pressure increase occurs within the chamber and forces adjacent inner and outer plates into contact with one another, resulting in torque being transferred by friction between the mating plates in addition to the viscous shear rate of the fluid. Once frictional contact has been established between the plates, torque transmission is suddenly and significantly amplified.

Viscous coupling plates are generally manufactured from a thin plate stock, such as a carbon steel plate material, that is formed by a series of dies in a stamping operation of a machine press. Subsequent to forming operations, the viscous coupling plates are subjected to heat treatment processes in an effort to achieve the desired mechanical and physical properties, such as strength, hardness, toughness and wear resistance, that are required in the finished product.

However, it has been learned through experience that conventional heat treatment techniques create distortion in the shape of the viscous coupling plates, causing the plates to be wavy and to fail to meet established requirements for flatness. Further, it is believed that heat treatment generally tends to create a non-uniform distribution of any residual stresses that remain in the plate as a result of the manufacturing operations which formed the plate. The combination of these heat treatment side effects causes the plates to be susceptible to "dishing", a phenomenon of permanent deformation that results from the operating conditions that are experienced by the plates in the viscous coupling apparatus. As a consequence of dishing, the performance of the viscous coupling apparatus is seriously degraded.

Previous attempts have been made to solve the problem of distortion that occurs in thin flat workpieces during heat treatment. Generally, these prior efforts have concentrated on methods involving subjecting a plurality of the distorted workpieces to a second heat treatment while the workpieces are placed under a compression force. Thus, each workpiece, having already undergone a first heat treatment to enhance its material properties, is processed in a second heat treatment that is aimed at reducing or eliminating the distortion. In the subsequent heat treatment, a plurality of the workpieces are fixtured so as to be stacked upon one another and clamped together under a compression force. These prior methods to reduce distortion in thin, flat workpieces, however, require strict controls on the second heat treatment process or result in negating the positive effects of the first heat treatment.

It is therefore an object of the present invention to overcome the disadvantages associated with conventional viscous coupling plates and to provide a method for manufacturing a viscous coupling plate which exhibits resistance to wear and to permanent deformation under operating conditions.

It is another object of the present invention to provide an improved method for hardening and flattening a viscous coupling plate. It is also an object of this invention is to produce a viscous coupling plate which exhibits the above advantages and which is cost effective to manufacture in a high volume production environment.

In achieving the above objects, the present invention provides for a method of hardening and flattening a viscous coupling plate generally combining a heat treatment process followed by a mechanical forming operation. The heat treatment process of the present invention generally comprises the steps of first surface hardening a viscous coupling plate by ferritic nitrocarburizing to produce an epsilon iron nitride surface layer on the plate. The plates are then quenched. Next, the plate is tempered without requiring that several plates be clamped together or otherwise touching during this step. Finally, each plate is worked in a mechanical forming operation comprising a flattening process. This is contrary to the accepted teachings in the prior art which discount the effectiveness of such individualized, workpiece-flattening efforts. The flattening process comprises passing the plates through a series of leveling rolls which cause the plates to flex in opposite directions to produce a sufficiently flat plate. The flattening process can incorporate a single pass or multiple passes through the leveling rolls. The flattening process eliminates any distortion in the plates and brings them within any required flatness specifications. Also, the flat rolling process serves to more uniformly redistribute any residual stresses that remain in the plates.

The resulting viscous coupling plates exhibit superior performance characteristics than prior plates. Most notably, the plates of the present invention resist the permanent deformation that has been experienced by prior viscous coupling plates under identical operating conditions.

Various other features and advantages of the present invention will become apparent to those skilled in the art to which this invention relates after having the benefit of studying the teachings of the specification and the claims.

DESCRIPTION OF THE PREFERRED EMBODIMENT

It should be understood from the outset that while the following discussion relates to a particular embodiment of the present invention, this embodiment merely represents what is presently regarded as the best mode of practicing the invention and other modifications may be made to the particular embodiment without departing from the spirit and scope of the invention.

The present invention provides a method of hardening and flattening a viscous coupling plate generally combining a heat treatment process followed by a mechanical forming operation. Although the following discussion is specifically addressing the hardening and flattening of viscous coupling plates, it should be readily appreciated by those in the art that the method of the present invention is equally suitable for other thin, disc-like workpieces such as clutch plates, thrust washers, shims, and the like.

Viscous coupling plates are generally manufactured from a thin plate stock, such as a carbon steel plate material, that is formed by a series of dies in a stamping operation of a machine press. The resulting plates are generally ring-shaped.

In preparation for the heat treatment process of the present invention, multiple viscous coupling plates are fixtured on racks in a manner such that individual plates are not in any contact with one another. Also, the plates are spaced as is necessary to ensure the adequate flow of the nitriding media over the entire surface of the plates. In a similar manner, multiple plates can alternatively be suspended or hung on rails.

The plates are then surface hardened in a ferritic nitrocarburizing process to create an epsilon iron nitride surface layer on the plates that is on the order of about 0.0003 inches to about 0.0015 inches thick, and preferably 0.0010 inches to about 0.0015 inches thick. The ferritic nitrocarburizing process is performed in a suitable nitriding media, which is preferably either a gaseous atmosphere, such as an atmosphere of ammonia and an endothermic gas, or a molten salt bath, such as one providing a source of nitrogen and carbon. The ferritic nitrocarburizing process is preferably performed at a temperature ranging from about 1050° F. to about 1200° F. for a time period of about one (1) to six (6) hours, and preferably for about three (3) to about three and one-half (3½) hours. After nitrocarburizing, the plates are then quenched to room temperature. Preferably the parts are either oil quenched or salt quenched followed by air cooling to room temperature.

To achieve metallurgical stability, the plates are next tempered. The tempering occurs while the plates are fixtured on the identical apparatus that was used during the preceding ferritic nitrocarburizing process. Consequently, refixturing or rearrangement of the plates prior to the tempering cycle is not required, nor is it necessary that the plates be clamped together or otherwise touching one another during this step. Thus, significant cost savings are achievable over conventional techniques which necessitate refixturing of the workpieces prior to tempering. However, refixturing of the plates could be performed, if desired, provided that the plates are not clamped together or otherwise touching one another. The plates are tempered for at least approximately two (2) hours at a temperature of at least approximately 350° F. The plates are then allowed to air cool to room temperature. It should be understood that the term "air cool" is intended to mean slow cooling, as distinguished from quenching.

Subsequent to the heat treatment, the viscous coupling plates are removed from their fixturing and are individually processed in a mechanical forming operation. The mechanical forming operation is a flattening process well-known in the art as roller leveling. The roller leveling eliminates any waviness or distortion in the plates without degrading the performance of the hardened surface layer of the plates. The roller leveling allows the plates to be made flat within about 0.002 inches to about 0.013 inches. This easily meets or exceeds any required flatness specifications for the plates. In addition, the flat rolling process serves to more uniformly redistribute any residual stresses that remain in the plates.

As the plates are passed through the leveling rolls, the leveling rolls act to flex the plates simultaneously in opposite directions to flatten the plate. The roller leveling can be accomplished by a single pass or though multiple passes of the viscous coupling plates through the leveling rolls.

The resulting viscous coupling plate exhibits ample surface wear resistance properties as well as superior resistance to dishing or permanent deformation when exposed to the operating environment of the viscous coupling apparatus. The surface hardness of the plate meets or exceeds a value of Rockwell C62.

The method of hardening and flattening viscous coupling plates of the present invention provides an improved method for hardening and flattening a viscous coupling plate in spite of the contradictory teachings of the prior art. Further, the present invention provides a method for producing a viscous coupling plate which exhibits improved properties and which is cost effective to manufacture in a high volume production environment.

The present invention has been described in an illustrative manner. It should be understood that the terminology which has been used is intended to be in the nature of words of description rather than of limitation. Many modifications or variations to the present invention are possible in light of the above teachings. Therefore, within the scope of the following claims, the present invention may be practiced otherwise than as specifically described.

What is claimed is:

1. A method for hardening and flattening viscous coupling plates used in drivetrains of motor vehicles and subjected to frictional contact with one another for torque transmission to provide wear resistance and improved resistance to plastic deformation during use, said method comprising the steps of:

(a) placing a plurality of viscous coupling plates spaced apart from one another in a fixture and while in said fixture sequentially:

(1) ferritic nitrocarburizing said viscous coupling plates from step (a) above at a temperature of about 1050° F. to about 1200° F. in a nitriding media for a time period of about three to about three and one-half hours and producing an epsilon iron nitride surface layer on said viscous coupling plates that is about 0.0010 inches to about 0.0015 inches thick and has a hardness of about Rockwell C62;

(2) oil quenching said viscous coupling plates from step (a)(1) to room temperature;

(3) tempering said viscous coupling plates from step (a)(2) for at least about two hours at a temperature of at least about 350° F.;

(4) air cooling said viscous coupling plates from step (a)(3) to room temperature;

(b) removing said viscous coupling plates from step (a)(4) from said fixture; and (c) passing said viscous coupling plates from step (b) through a series of leveling rolls at least once to bring said plates to within about 0.002 inches to about 0.013 inches flatness and to more uniformly redistribute any residual stresses that remain in said plates and to render said plates less susceptible to deformation during use in the drivetrain of a motor vehicle.

* * * * *